United States Patent [19]

Sakaguchi et al.

[11] 3,810,206
[45] May 7, 1974

[54] EXPOSURE CONTROL DEVICE

[75] Inventors: Keiichi Sakaguchi, Yokohama; Atsushi Someya, Tokyo; Noritsugu Hirata, Yokohoma, all of Japan

[73] Assignee: Cann Kabushiki Kaisha, Tokyo, Japan

[22] Filed: May 30, 1972

[21] Appl. No.: 258,104

[30] Foreign Application Priority Data
June 1, 1971 Japan............................ 46-45557

[52] U.S. Cl.............. 95/10 PO, 95/10 C, 95/10 CD
[51] Int. Cl............................ G03b 7/10, G03b 7/20
[58] Field of Search............ 95/10 C, 10 PO, 10 CD

[56] References Cited
UNITED STATES PATENTS

| | | | |
|---|---|---|---|
| 3,592,116 | 7/1971 | Ritze............................... | 95/10 CD |
| 3,532,043 | 10/1970 | Shimomura et al................. | 95/10 C |

FOREIGN PATENTS OR APPLICATIONS

| | | | |
|---|---|---|---|
| 1,295,852 | 5/1962 | France............................ | 95/10 PO |

Primary Examiner—Fred L. Braun
Assistant Examiner—Russell E. Adams, Jr.
Attorney, Agent, or Firm—Flynn & Frishauf

[57] ABSTRACT

An exposure control device for cameras or the like is provided with means for controlling the exposure light beam incident through an phototaking optical system, means for controlling the photometric light beam incident upon a photoelectric cell and means for controlling the photometric field. The exposure and photometric light beam control means are so located that the optical paths to the variable stops thereof are different in length from each other. The photometric field control means is actuated in response to at least one of the exposure factors, that is the brightness of a subject or field of view, the focal length control of the exposure optical system, and the focusing control of the phototaking optical system in response to a distance from the phototaking optical system to said subject so that the light beam incident upon the photometric light beam control means may be so controlled as to automatically vary the photometric field.

33 Claims, 18 Drawing Figures

EXPOSURE CONTROL DEVICE

BACKGROUND OF THE INVENTION

1. Field of the Invention

The present invention relates to an improvement of an exposure control device for use with a camera or the like.

2. Description of the Prior Art

In general, the conventional exposure control device comprises a photometric photoelectric conversion element such as photoelectric cell whose output is dependent upon the brightness of a subject, an energy transducer means for transducing the output of the photoelectric cell into the mechanical or electrical output and amplifying the latter, and a light beam control means for controlling the light beam reaching the film. That is, the light beam control means is actuated in response to the brightness of the subject so that the optimum exposure may be attained. The photometric systems used in the exposure control devices are generally divided into the average metering in which the average brightness of the whole field of view is measured, and the spot metering in which only a desired spot in the field of view, preferably a spot around the center of the field of view is measured. When the brightness of the subject is low, the average metering is used whereas the spot metering is used when the brightness of the subject is high or especially in case of the rear lighting for the optimum exposure. In the cameras having a zoom lens system or variable-focal-length optical system, the spot metering is advantageous in the telephoto position that is when the focal length is long, whereas the average metering is advantageous when the focal length is short or in the wide position. Furthermore, the average metering is used when the subject is located at a relatively longer distance for example at infinity from the camera or the like whereas the spot metering is advantageous when the subject is located at a relatively shorter distance for example the minimum focusing distance away from the camera or the like.

However, the prior art exposure control devices are either of the average or spot metering type, and there has not been proposed an exposure control device capable of both the average and spot metering. Therefore, when a subject with a relatively bright background is photographed with the rear lighting with the aid of the average metering, the result is the underexposure. On the other hand, when the subject in the relatively dark background which is spot-lighted by for example a candle light, is photographced with the aid of the spot exposure meter, the exposure light is restricted too much, resulting in the underexposure. In like manner, the underexposure or overexposure results when only one of the average and spot metering is used when the focal distance is varied or when the focusing is made. The advantage and disadvantage of the average and spot metering systems under various conditions may be summaried as follows:

| Conditions | Brightness of subject | | Focal length of camera lens | | Distance from camera to subject | |
|---|---|---|---|---|---|---|
| | High | Low | Long (tele) | Short (wide) | Long | Short |
| Average metering | X | O | X | O | O | X |
| Spot metering | O | X | O | X | X | O | where O = preferable, and

X = not preferable. However, the prior art exposure control devices cannot switch between the average and spot metering.

In some types of the cameras, the number of which is very limited, an exposure light beam control stop or diaphragm disposed in an exposure optical system is mechanically coupled to a photometric light beam control stop or diaphragm disposed in the so-called external photometric optical system provided independently of the exposure optical system. The photometric light beam control stop serves more or less to control the photometric field and has a relatively small aperture when the brightness of the subject is high, so that the photometric field is reduced, that is the spot metering is made when the brightness of the subject is high. On the other hand, when the brightness of the subject is low, the aperture of the photometric light beam control stop is increased so that the average metering is made. However, when the so-called external photometric optical system is employed, there is a relatively great parallax between the photomaking and photometric optical system so that the photometric field will not coincide with the field of view for exposure. Therefore, when the brightness of the subject is bright so that the spot metering is made, the optimum exposure cannot be attained. Furthermore, the photometric field cannot be varied depending upon the adjustment of the focal length and the focusing control.

SUMMARY OF THE INVENTION

One of the objects of the present invention is therefore to provide an improved exposure control device which may automatically switch between the average and spot metering operations for the optimum exposure in response to the brightness of the subject or field of view for exposure, the focal length adjustment, and the focusing control.

Briefly stated, according to the present invention, an exposure light beam control means is disposed in a phototaking optical system, and a photometric light beam control means is disposed in a photometric optical system which is a part of the phototaking optical system or which is optically split from the phototaking optical system. The optical paths toward the two control means along which the incident light beams travel are different in length, and the phototaking and photometric light beam control means are operatively coupled to each other. A photoelectric conversion element is disposed behind the photometric beam control means in the photometric optical system so that in response to the output of the photoelectric conversion element, the photometric light beam control means is controlled.

As described above, the optical paths toward the exposure or phototaking and photometric light beam control means are different in length from each other so that of the so-called chief rays passing through the center of the aperture of the exposure light beam control means, the light rays from the periphery of the field of view will not have corresponding chief rays passing through the center of the photometric light beam control means, become off-axis rays. As a consequence, in response to the variation in aperture of the photometric light beam control means, the rays off the axis are subject to the control by being cut off ("eclipsed") by the diaphragm of the control means if the rays are more than a certain amount off axis, so that the photometric field is varied. Thus, when the field of view is bright, spot metering is performed whereas when the field of view is dark, average metering is carried out. Since the optical paths to the exposure light beam control means and to the photometric light beam control means are different in length from each other as described hereinbefore, the eclipse of the rays off the axis by the photometric light beam control means in the photometric optical system is increased as the focal length is increased. Therefore, when the focal length is longer, spot metering is performed whereas when the focal length is shorter, average metering is performed. In like manner, the eclipse is increased as the distance from the camera lens to the subject is decreased. Therefore, when the distance from the camera to the subject is short, spot metering is made whereas the distance is longer, average metering is performed. The whole optical system may be easily designed in such a manner that the eclipse by the photometric light beam control means may be decreasd in response to the brightness of the subject or field or view, the focal length adjustment, and the focusing control, that is the distance between the camera and the subject, in the order named, so that the exposure control device in accordance with the present invention may be advantageously used in practice.

Another object of the present invention is to provide a novel mechanism for cameras incorporating the exposure control device in accordance with the present invention, which mechanism may arbitrarily control the photometric field.

Another object of the present invention is to provide a novel mechanism for cameras incorporating the exposure control device in accordance with the present invention, which mechanism may automatically vary the photometric field in response to the information such as a focal length of an interchangeable lens mounted on the camera body.

Another object of the present invention is to provide a novel mechanism for cameras incorporating the exposure control device in accordance with the present invention, which mechanism may not only vary the photometric field but also display in the viewfinder the signal representing the photometric field.

The above and other objects, features and advantages of the present invention will become more apparent from the following description of the preferred embodiments and variations thereof taken in conjunction with the accompanying drawings.

DESCRIPTION OF THE PREFERRED EBMODIMENTS

Figure 1:
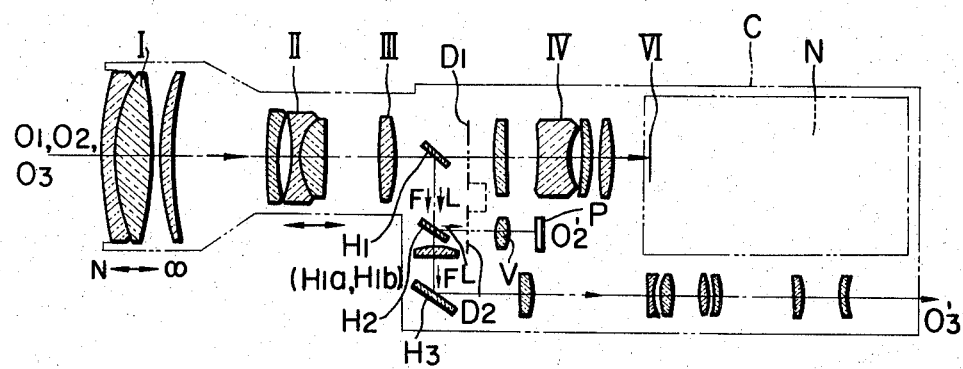
FIG. 1 is a sectional view of an optical system to which is applied a first embodiment of the exposure control device in accordance with the present invention.

Referring first to FIG. 1, the optical system will be described. A zoom optical system comprises a focusing group I which may focus a subject from the minimum focusable distance to the infinity, a variator group II, and a compensator group III which may also serve as a focusing group in close up photography. A relay lens group IV is disposed behind the zoom optical system I, II and III. Thus, the optical path $O_1-O_1'$ for photography comprises the zoom optical system I, II and III and the relay lens group IV through which the light from a subject falls upon a film VI in a magazine N mounted in a camera C. The focusing group I, the variator group II, and the compensator group III may be shifted along the optical axis. A variable stop $D_1$ is interposed between the compensator group III and the relay lens group IV in order to control the exposure light beam or luminous flux reaching the film VI. A part of the light passing through the zoom system I, II and III is redirected by a reflecting mirror $H_1$ at a first half portion H–1a thereof to a viewfinder optical system $O_3—O_3$, and at a second half portion H–1b to a photometric optical system $O_2-O_2'$. That is, the photometric optical system $O_2-O_2'$ comprises the zoom system I, II and III, the reflecting mirror $H_1$ (the second half portion $H_{1b}$), and a reflecting mirror $H_2$ disposed so as to redirect the light to a condenser lens V through a variable stop $D_2$ so that the light from a portion slightly below the center of the field of view may reach a photoelectric conversion element P.

The path difference between the optical paths to the variable stops $D_1$ and $D_2$ equals the optical distance between the two reflecting mirrors $H_1$ and $H_2$. Therefore as described above the eclipse of the light rays off the axis varies depending upon the aperture of the variable stop $D_2$ so that when the aperture of the variable stop $D_1$ is small, that is when the whole view of field is bright, spot photometry is performed whereas when the aperture of the stop $D_1$ is wide, that is when the field of view is dark, average photometry is performed. As described hereinbefore, the eclipse of the light rays off the axis varies depending upon the change in focal length and the focusing adjustment so that the desired photometry may be attained.

Figure 2:
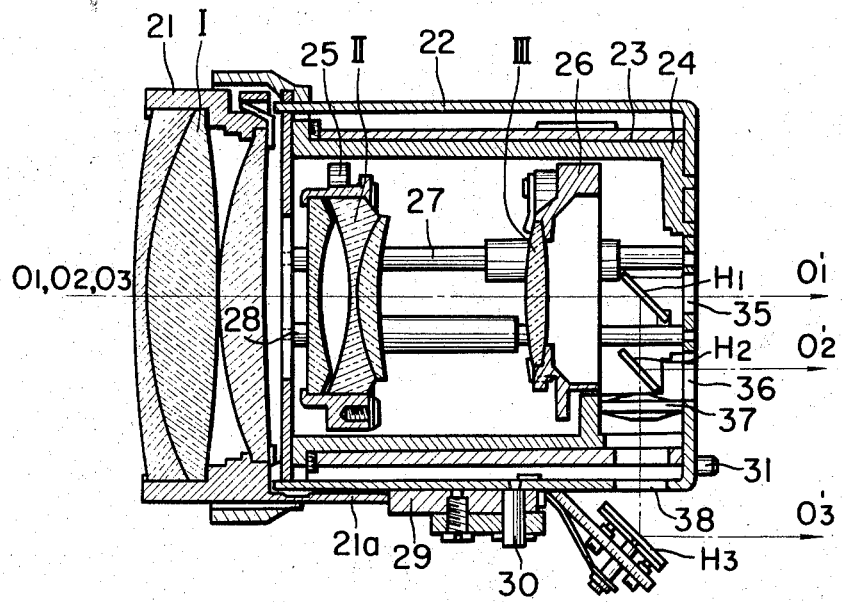
FIG. 2 is a detailed sectional view of a zoom lens systems thereof.
Figure 3:
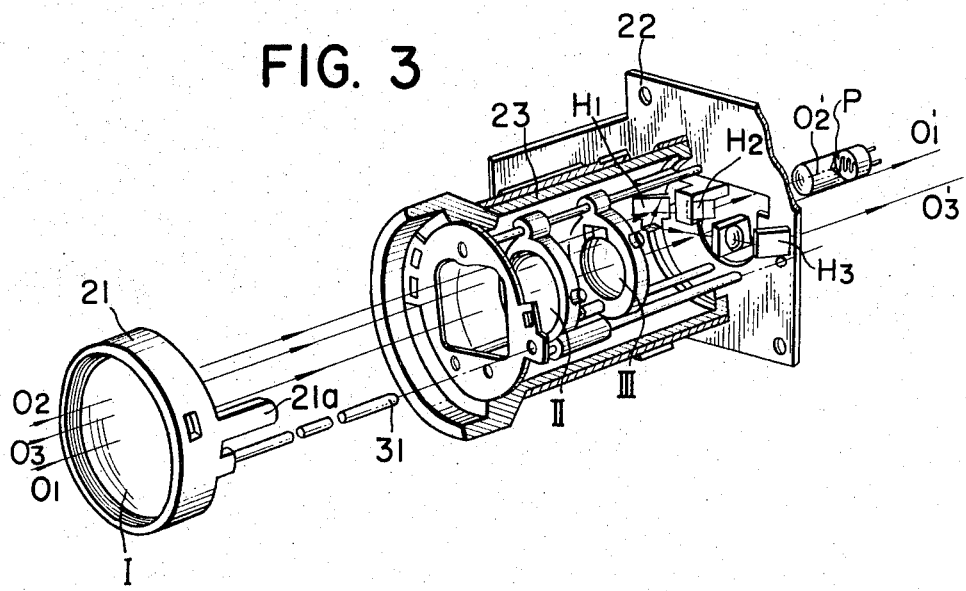
FIG. 3 is an exploded perspective view thereof.

FIGS. 2 and 3 show the practical construction of the optical system shown in FIG. 1. The lenses in the focusing group I are held by a lens holder 21 which has a backwardly extended portion 21a whose rear end is pressed against a focusing member 29 under the force of a spring (not shown). Therefore, when the focusing member 29 rotates abouts its pivot pin 30, the lens holder 21 is shifted along the optical axis. The zoom lens system is disposed in a casing 22. The variator and compensator groups II and III are shifted in a predetermined spaced part relation by a cam ring 23 which has a cam groove into which is fitted a pin (not shown). That is, the lens holders 25 and 26 of the variator and compensator groups II and III are shifted along guide members 27 and 28. The cam ring 23 is fitted over a lens barrel 24. The shifted position of the focusing group I is transmitted to a suitable mechanism on the side of the camera body through a signal transmitting member 31. An opening 35 is provided for the optical path for photography $O_1$–$O_1'$; an opening 36, for the photometric optical path $O_2$–$O_2'$; and an opening 38, for the viewfinder optical path $O_3$–$O_3'$. The light incident upon the photoelectric conversion element P is converted into the electrical signal.

Figure 4:
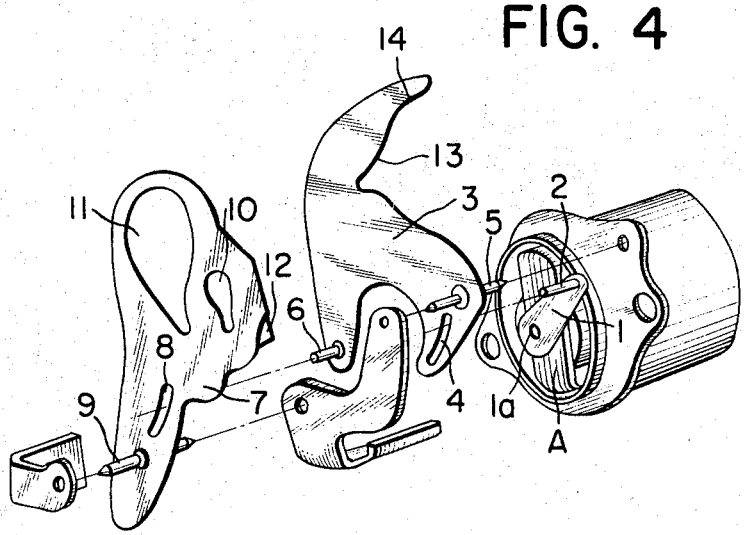
FIG. 4 is an exploded perspective view of an exposure and photometric light beam control means used in the exposure control device in accordance with the present invention.
Figure 5:
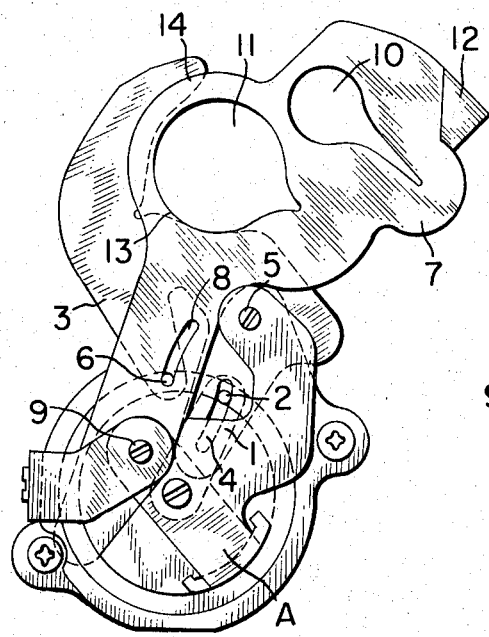
FIG. 5 is a front view thereof.
Figure 6:
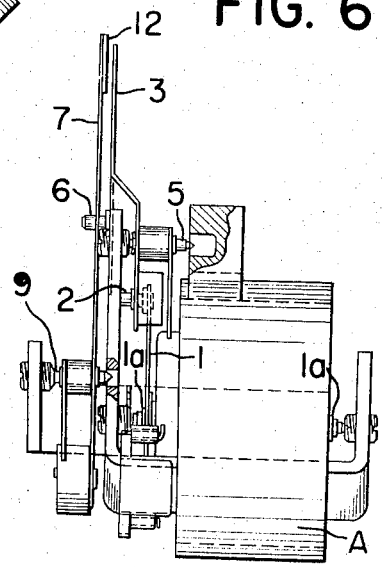
FIG. 6 is a side view thereof.

Next, referring to FIGS. 4, 5 and 6, one embodiment of an aperture or light beam control device will be described for controlling the apertures of the variable stops $D_1$ and $D_2$ while maintaining the one-to-one correspondence therebetween. One end of a lever 1 is fixed to a rotary shaft 1a of an ammeter A, and a pin 2 is extended from the other end of the lever 1. The pin 2 is fitted into a slot 4 of a first blade 3 so as to transmit the rotation of the shaft 1a of the ammeter A. The first blade 3 rotates about its pivot pin 5, and has a pin 6 fitted into a slot 8 formed in a second blade 7 so as to cause the latter to rotate about its pivot pin 9. The second blade 7 has a photometric light beam control aperture 10 and an exposure light beam control aperture 11 which cooperate with a photometric light control member 14 and an exposure light control member 13 of the first blade 3 respectively. That is, in response to the angle of rotation of the ammeter A, the first and second blades 3 and 7 are rotated so that the apertures of the variable stops $D_1$ and $D_2$ may be defined by the exposure light beam control opening 11 and member 13 and by the photometric light beam control opening 10 and member 14. The second blade 7 is provided with an alarm mark 12 which may be selectively inserted into the view-finder optical system $O_3$–$O_3'$ when the brightness of a subject is too low. It is obvious to those skilled in the art that a portion of the alarm mark 12 may be used in order to display in the viewfinder the variation in photometric field in response to the variation in aperture of the variable stop $D_2$.

Figure 7:
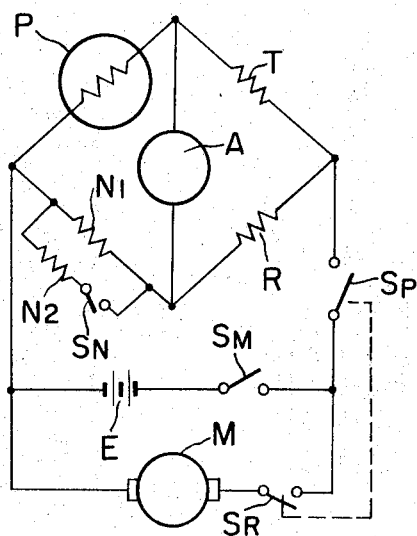
FIG. 7 is an electric circuit diagram of an energy transducer means used in the exposure control device in accordance with the present invention.

Next referring to FIG. 7, an energy transducer used in the present invention will be described. A bridge circuit comprises the photoelectric conversion element P, a resistor T for setting a shutter speed, a reference resistor R, and film speed setting resistors $N_1$ and $N_2$. A switch $S_V$ is closed when a film with a low speed is used, but is opened when a film with a high speed is used. The ammeter A is inserted diagonally. Reference character E denotes a power source; M, a motor for transporting the film; $S_R$, a shutter release switch; and $S_p$, a switch for the exposure control circuit. The switch $S_R$ is operatively coupled to the switch Sp in such a manner that the former may be closed only after the latter has been closed. The feedback control of the aperture of the variable stop $D_2$ may be therefore accomplished by the exposure control circuit including a comparator circuit in response to the brightness of light measured by the photometric circuit. Since the variable stops $D_1$ and $D_2$ are operatively coupled to each other so that the one-to-one correspondence between them may be established. And the feedback control of the variable stop $D_1$ may be accomplished in such a manner that the exposure may be maintained always constant in response to the photometric range which in turn varies in response to the brightness of the field of view.

Next the other embodiment of the present invention will be described with reference to FIG. 8, in which same reference numerals used to designate the component parts shown in FIG. 1 are also used to denote similar component parts. This embodiment is different from the first embodiment in that the variable stop $D_1$ for controlling the light rays reaching the film and the variable stop $D_2$ for controlling the light rays reaching the photoelectric converting element P are so arranged as to shift along the optical axes while maintaining a predetermined relation therebetween. Therefore, the path difference between the movable variable stops $D_1$ and $D_2$ may be adjusted so that the eclipse of the light rays from the periphery of the scene may be varied. As a result, the photometric range may be varied. The variable stops $D_1$ and $D_2$ are operatively coupled to each other as indicated by the dashed lines, and the shift of the variable stops $D_1$ and $D_2$ in response to the output signal of the ammeter A may be displayed in the image focusing plane Q in the viewfinder optical path $O_3$–$O_3'$.

Figure 8:
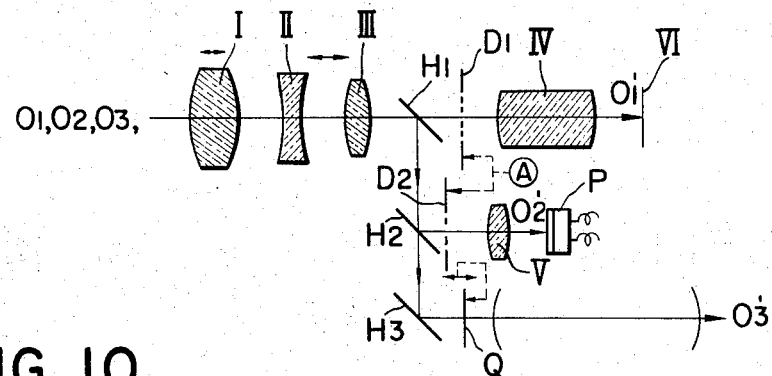
FIG. 8 is a schematic diagram of a second embodiment the exposure control device in accordance with the present invention.
Figure 9A:
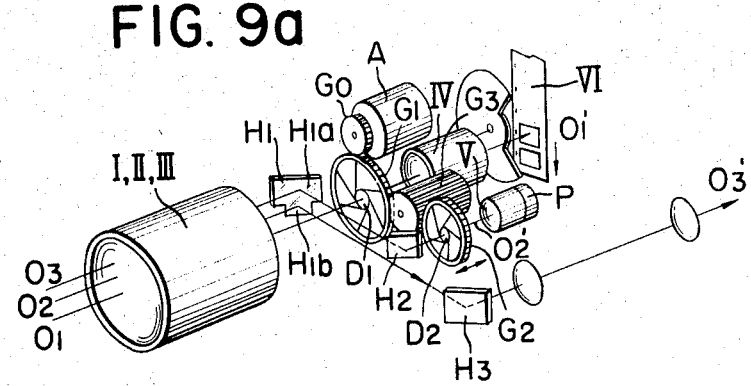
FIGS. 9a and 9b are persepective views of the practical arrangements of the second embodiment shown in FIG. 8.
Figure 9B:
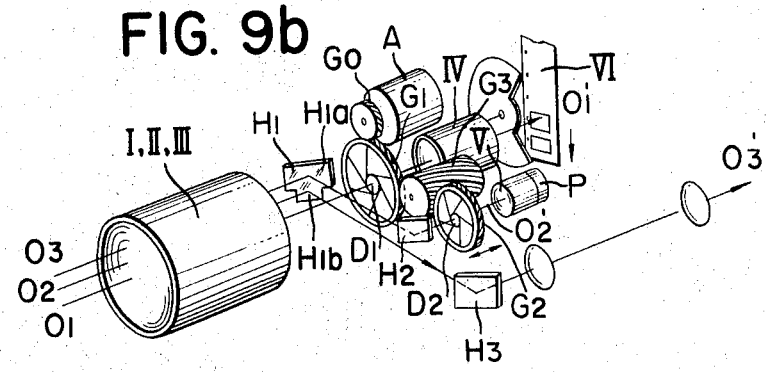

The practical constructions of this embodiment shown in FIG. 8 are illustrated in FIGS. 9a and 9b. In the embodiment shown in FIG. 9a, the variable stops $D_1$ and $D_2$ have the toothed peripheries $G_1$ and $G_2$ which are in mesh with an idle gear $G_3$ having long teeth extended in parallel with the optical axis. A gear $G_0$ is coupled to the ammeter A or a conventional servomotor and is in mesh with the gear $G_1$ so that in response to the rotation of the shaft of the ammeter A, the apertures of the variable stops $D_1$ and $D_2$ may be varied. The one-to-one correspondence between the apertures of the variable stops $D_1$ and $D_2$ may be maintained, and the variable stop $D_2$ for controlling the light rays reaching the photoelectric converting element P may be shifted along the photometric optical path $O_2$–$O_2'$. The shift of the variable stop $D_2$ may be controlled externally of the camera or the like.

In a variation shown in FIG. 9b, the gears $G_0$–$G_3$ are all helical gears so that the ratio of the aperture of the variable stop $D_1$ to the aperture of the variable stop $D_2$ may be varied when the latter is shifted along the optical axis. This arrangement is advantageous especially when the sufficient correction of the photometric range cannot be attained only by the shift of the variable stop $D_2$ alone. It is readily seen that the aperture of one of the stops $D_1$ and $D_2$ may be fixed while the aperture of the others may be varied. Alternatively, both variable stops may be varied even though the arrangement becomes rather complex. The variation in photometric field may be displayed at the image focusing plane Q in the viewfinder optical path $O_3$–$O_3'$.

In the embodiments to be described with reference to FIGS. 10–15, same reference numerals are used to denote similar component parts, and only the points different from the first embodiment illustrated in and described with reference to FIGS. 1 and 2 will be described briefly because detailed constructions will be obvious to those skilled in the art from the description of these embodiments.

Figure 10:
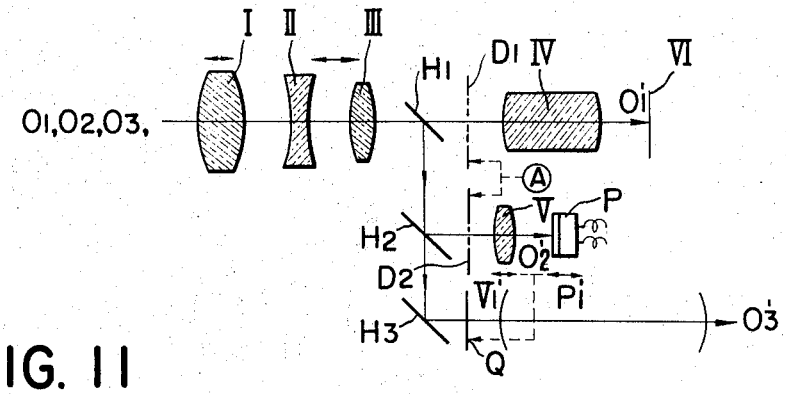
FIGS. 10–14 are schematic views of a third, fourth, fifth, sixth and seventh embodiments of the exposure control device in accordance with the present invention.

In the embodiment shown in FIG. 10, the condenser lens V and the photoelectric conversion element P are moved relative to each other as indicated by the double-pointed arrows V' and P' so that the photometric field may be varied. Alternatively, one of the condenser lens V and the photoelectric conversion element or cell P may be moved relative to the other in order to attain the correction in photometry by utilizing the out-of-focus image upon the photoelectric cell. Furthermore it is also possible to shift the condenser lens V and the photoelectric cell P relative to the variable stop $D_2$ while maintaining the relative position between the lens V and the cell P. The variable stop $D_2$ may be interposed between the condenser lens V and the photoelectric cell P so that the photometric field may be controlled by the variable stop $D_2$. It is also possible to shift the lens V and the cell P in unison with the shift of the variable stop $D_1$ and/or the variable stop $D_2$.

Figure 11:
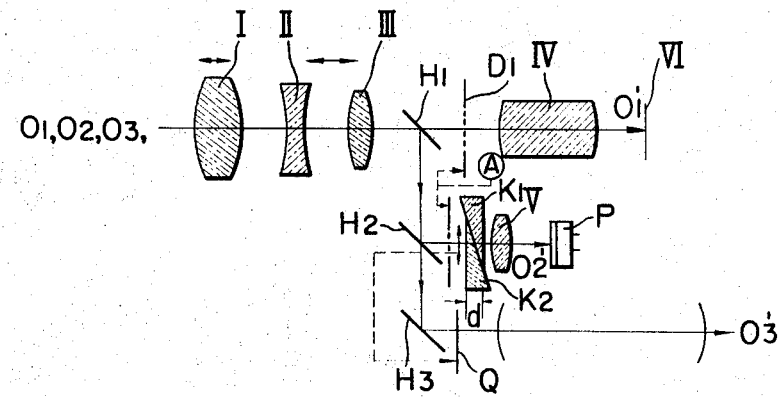

In the embodiment shown in FIG. 11, the variation in photometric field due to the path difference between the two variable stops $D_1$ and $D_2$ is attained by the optical method not by the mechanical method. A pair of thin wedge-shaped prisms $K_1$ and $K_2$ having a refractive index $n$ different from that of the air are interposed between the variable stop $D_2$ and the condenser lens V for movement in unison in the vertical directions indicated by the double-pointed arrow relative to the optical axis $O_2$–$O_2'$. In this case, the rate of the change in optical path is given by $$\Delta = d\,[\,1 - (1/n)\,]$$

where $d$ = effective thickness to the photometric rays of prisms $K_1$, $K_2$ along the optical axis. Thus, the correction of the photometric field may be accomplished in a similar manner to that described above. In the instant embodiment, the light rays from the periphery of the object may be deflected by the refraction by the prisms $K_1$ and $K_2$ so that the photometric field may be varied.

Figure 12:
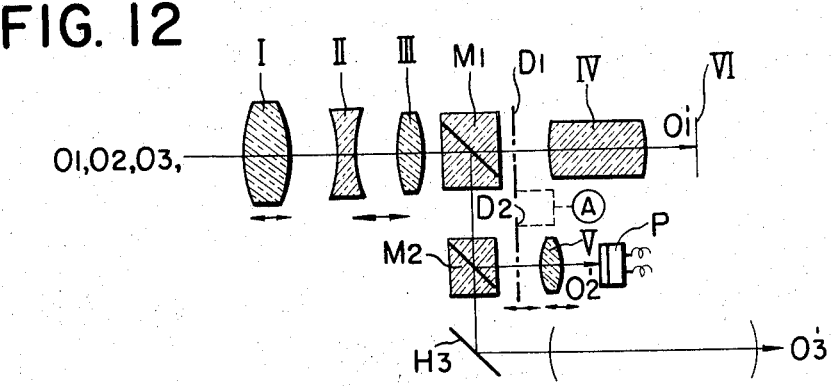

In the embodiment illustrated in FIG. 12 instead of the reflecting mirrors $H_1$ which is shown as being disposed at the periphery of the diaphragm stop for photography in the previous embodiments, a first beam splitter $M_1$ is interposed between the variable stop $D_1$ and the compensator III in the optical path for photography so that the light rays may be redirected toward the optical paths for photometry and viewfinder $O_2$–$O_2'$ and $O_3$–$O_3'$. A second beam splitter $M_2$ is disposed instead of the second reflecting mirror in order to split the light beam into the two light beams for photometry optical path $O_2$–$O_2'$ and viewfinder optical path $O_3$–$O_3'$. In the previous embodiments, the center of the photometric field is located slightly below the center of the view of field, but in the instant embodiment, the centers of the photometric field and the field of view may be made coincident to each other. The arrangements of the other component parts are substantially similar to those of the previous embodiments.

Figure 13:
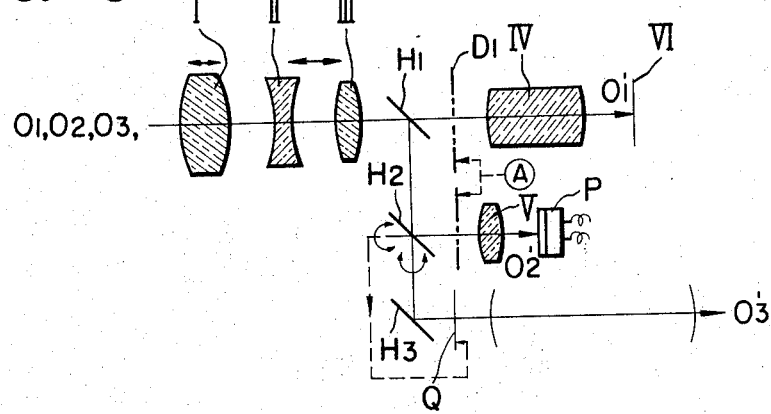

In the embodiment shown in FIG. 13, the portion of the reflecting mirror $H_2$ which is not used to control the light beam entering into the photometric optical path $O_2$–$O_2'$ has a spherical surface, and the reflecting mirror $H_2$ is rotatably supported by a ball-and-socket bearing so that the photometric optical path $O_2$–$O_2'$ may be inclined relative to the optical path $O_1$–$O_1'$ for photography. In the instant embodiment it is preferable to display the center of the photometric field which may be varied, at the image focusing plane Q in the optical path for viewfinder.

Figure 14:
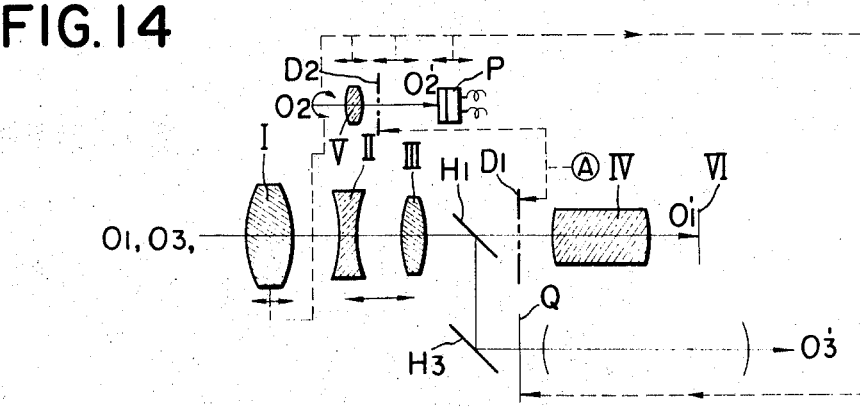

In the embodiment illustrated in FIG. 14, the present invention is shown as being applied to the so-called external photometric system. In the photometric optical path $O_2$–$O_2'$ which has a greater parallax relative to the photographic optical path $O_1$–$O_1'$, the condenser lens V, the variable stop $D_2$ for controlling the photometric light beam and the photoelectric cell P are disposed in the order named. The variable stop $D_2$ is operatively coupled to the variable stop $D_1$ for controlling the light beam striking the film VI and may be shifted along the optical path $Q_2$–$O_2'$ as in the case of the embodiments shown in FIG. 9. The variable stop $D_2$ functions as a stop for controlling the photometric field, the automatic adjustment of the photometric field may be attained in response to the brightness of the subject or of the field of view. The correction of the photometric field may be also accomplished by the shift of the variable stop $D_2$ along the photometric optical axis $O_2$–$O_2'$. As in the case of the embodiment shown in FIG. 13, the photometric optical path $O_2$–$O_2'$ may be so arranged as to incline relative to the photographic path $O_1$–$O_1'$, and the variation in photometric field when the variable stop $D_2$ is shifted along the optical path $O_2$–$O_2'$ is displayed preferably on the image focusing plane Q in the viewfinder optical path $O_3$–$O_3'$ as indicated by the broken lines. More preferably, the shift of the variable stop $D_2$ along the optical path $O_2$–$O_2'$ may be coupled operatively to the focusing operation so that the deviation of the center of the photometric field from the center of the field of view may be compensated.

Figure 15A:
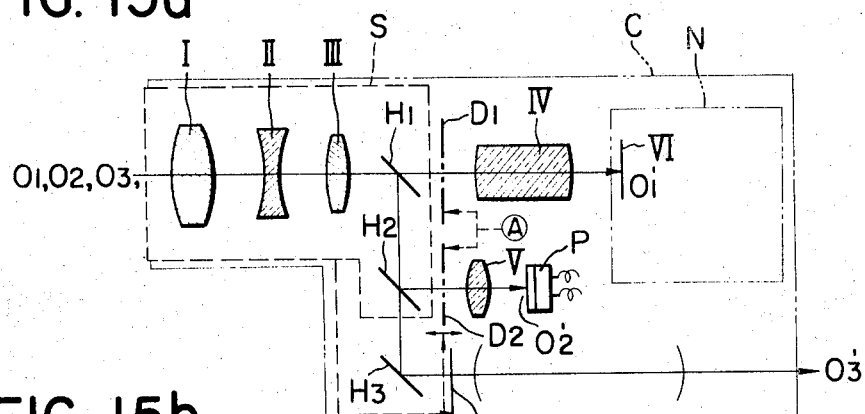
FIGS. 15a, 15b and 15c are schematic views illustrating the variations of the embodiments shown in FIGS. 10–14, at least one of the optical elements of an exposure optical system being interchangeable.
Figure 15B:
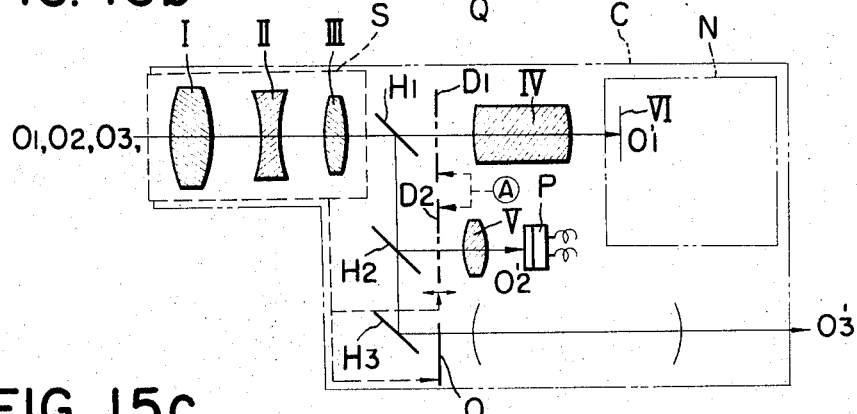
Figure 15C:
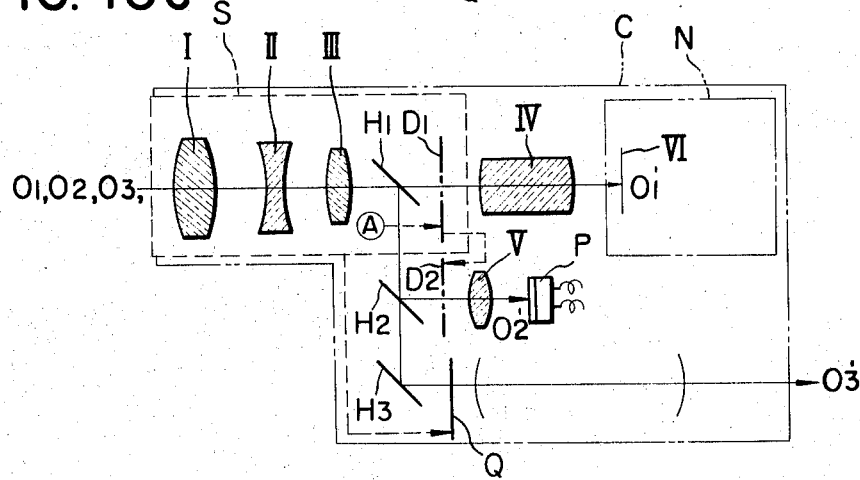

FIGS. 15a, 15b and 15c illustrate the variations of the embodiments described hereinbefore with reference to FIGS. 1–14 are applied to the camera C having the film magazine N mounted therein. Briefly stated, the exposure control device in accordance with the present invention is incorporated in an interchangeable lens in such a manner that when the latter is mounted on the camera C, the data in photography such as a distance from the lens to the subject or the like may be transmitted to the exposure control device in order to arbitrarily control the photometric field. In FIGS. 15a–15c, the blocks encircled by the broken lines are so constructed that these blocks may be removably mounted on the camera C. The interchangeable lenses have the means for transmitting the signals representing their data so that the latter may be displayed in the image focusing plane Q in the viewfinder optical path $O_3$–$O_3'$. Any of the embodiments of the exposure control device in accordance with the present invention described so far may be used so that the optimum photometric field may be obtained in response to the distance from the lens to the subject.

In the variation shown in FIG. 15a, the interchangeable lens S incorporates the reflecting mirrors $H_1$, $H_2$ and $H_3$ of the types described hereinbefore, and the camera body C incorporates the variable stops $D_1$ and $D_2$ and the ammeter A.

In the variation shown in FIG. 15b, the interchangeable lens S comprises optical elements alone whereas the beam splitters, the variable stops $D_1$ and $D_2$ and the ammeter A are all disposed in the camera body C.

In the variation shown in FIG. 15c, the beam splitter H, the variable stop $D_1$ and the ammeter A are disposed in the interchangeable lens S whereas the beam splitters $H_2$ and $H_3$ and the variable stop $D_2$ are disposed in the camera body C.

As described above, according to the present invention the photometric system may be automatically switched between the average metering and the spot metering in response to the conditions for photography so that the optimum exposure factors may be attained. Furthermore, any desired photometric field may be measured, and the photometric field may be automatically varied when the lenses are changed. The exposure control device in accordance with the present invention is simple in construction and may control the exposure with a higher degree of accuracy. The exposure control device in accordance with the present invention may be best suited for use with still or cine cameras. It should be understood that the present invention may be also applied to the exposure control device of the type using the electrically driven variable stops.

We claim:

1. An exposure control device comprising:
   a. means for controlling the phototaking light beam in a phototaking optical system, which is located at a position where the marginal rays intersect the optical axis of the phototaking optical system;
   b. photometer means responsive to a photometric light beam having at least one electrical output;
   c. means for controlling the photometric light beam located in a photometric optical system considerably away from a position where the marginal rays intersect the optical axis of the photometric optical system, to permit said photometric light beam control means to control the passage of the marginal rays and thereby to control a photometric field;
   d. means for varying the photometric field by affecting the operating relation of said respective means for controlling said phototaking and photometric light beams in response to at least one of the exposure factors such as the brightness of a subject, the focusing control of the photographic optical system and the focal length control of the photographic optical system;
   e. means automatically driven by electrical output of said photometer means for simultaneously controlling said photometric light beam control means and said phototaking light beam control means in a predetermined relation affecting, so far as concerns said photometric optical system, the amount of light admitted through said photometric light beam control means in a quantity taking acount of change of photometric field resulting from said automatic actuation;
   f. said phototaking and photometric light beam control means being so located that the optical paths to said two control means of the light beams incident upon said two control means are different in length from each other.

2. An exposure control device according to claim 1, wherein said phototaking light beam control means comprises a variable stop and said photometric light beam control means comprises a variable stop.

3. An exposure control device as set forth in claim 1 wherein at least one of said phototaking and photometric light beam control means has a member shiftable along the optical axis which is operated by said means for varying the photometric field.

4. An exposure control device as set forth in claim 1 wherein said means for varying the photometric field comprises means for varying the optical path difference between said phototaking and photometric light beam control means.

5. An exposure control device as set forth in claim 4 wherein said means for varying said optical path difference between said phototaking and photometric light beam control means comprises means for inclining the axis of the photometric optical system relative to that of the exposure optical system.

6. An exposure control device as set forth in claim 4 wherein said means for varying said optical path difference between said phototaking and photometric light beam control means comprises optical elements having a refractive index different from that of the air and capable of varying the photometric field by the refraction of the light beam through said optical elements.

7. An exposure control device as set forth in claim 4 wherein said means for varying said optical path difference between said phototaking and photometric light beam control means comprises optical means for splitting the light beam incident onto said optical system for photography.

8. An exposure control device as set forth in claim 7 wherein said optical means comprises reflecting mirrors capable of causing the total reflection of the light beam incident thereupon.

9. An exposure control device as set forth in claim 7 wherein said optical means comprises prisms.

10. An exposure control device as set forth in claim 2 wherein said photometer means comprises a photoelectric converting means having at least one photoelectric converting element which is disposed behind said variable stop for controlling the photometric light beam.

11. An exposure control device as set forth in claim 10 wherein said means driven by the output of said photometer means comprises a comparator circuit having said photoelectric cell included as a circuit component part thereof for generating the output signals in response to which said phototaking and photometric control means are controlled.

12. An exposure control device as set forth in claim 11 wherein said means driven by the output of said photometer means further comprises a driving means which is actuated in response to the output signals from said comparator circuit for driving said phototaking and photometric light beam control means.

13. An exposure control device as set forth in claim 12 wherein said driving means further comprises a meter.

14. An exposure control means as set forth in claim 12 wherein said driving means comprises a motor.

15. An exposure control device for use with a photographic apparatus having a phototaking optical system, a photometric optical system and a view finder, at least a part of said phototaking optical system being interchangeable, said exposure control device comprising:

a. means for producing the signal representing the conditions in photography from said interchangeable phototaking optical system including photometer means responsive to a photometric light beam derived from light passing through said interchangeable optical system;

b. means for controlling the phototaking light beam incident through said phototaking optical system, which is located at a position where the marginal rays intersect the optical axis of the phototaking optical system;

c. means for controlling the photometric light beam incident through said phototaking optical system which is located away from a position where the marginal rays intersect the optical axis of the photometric optical system to permit said photometric light beam control means to control the passage of the marginal rays and thereby to control a photometric field;

d. means for varying the photometric field which receives said signals from said signal producing means and which is automatically actuated in response to at least one of the exposure factors such as the brightness of a subject, the focal length control of said phototaking optical system and the focusing control of said phototaking optical system, so that the light beam incident on said photometer means is so controlled as to automatically vary the photometric field;

e. coordinating means for providing control of said phototaking light beam control means simultaneously with control of said photometric light beam control means in a predetermined relation;

f. said phototaking and photometric light beam control means being so located that the optical paths to said control means of the light beams incident thereupon are different in length from each other.

16. An exposure control device as set forth in claim 15 wherein said photometer means comprises means for displaying in one area of the optical path for said viewfinder said signals representative of said conditions in photography.

17. An exposure control device as set forth in claim 15 wherein said phototaking and photometric light beam control means control the exposure and photometric light beams in independent optical systems, respectively.

18. An exposure control devie as set forth in claim 17 wherein said means for varying the photometric field comprises means for varying said optical path difference between said exposure and photometric light beam control means.

19. An exposure control device as set forth in claim 17 wherein said photometric field control means comprises means for inclining the axis of the photometric light beam which is controlled by said photometric light beam control means, relative to the axis of the phototaking light beam.

20. An exposure control device for use with a camera having a phototaking optical system and a photometric optical system, which comprises:

a. first restricting means for restricting light quantity passing therethrough, of the light beam formed by said phototaking optical system, said means being disposed in an optical path of light coming from an object to be photographed and at a position where the marginal rays intersect the optical axis of the phototaking optical system;

b. a feedback control system for exposure control including, in combination, second restricting means for restricting light quantity passing therethrough, of the light beam formed by said photometric optical system, said second restricting means being disposed in an optical path of said photometric optical system and away from a position where the marginal rays intersect the optical axis of the photometric optical system to permit said second restricting means to control the passage of marginal rays and thereby to control a photometric field, photoelectric transducer means having a photoelectric transducer element disposed at a position for receiving the light beam restricted by said second restricting means, and producing an electric output signal in response to the intensity of light impinging thereon, a comparator circuit for exposure control having said photoelectric transducer element in a part thereof and at least one element for setting information on photographing conditions for exposure control, said circuit comparing the output signal of said photoelectric transducer element with a command set in said circuit for exposure control and producing an output signal in response to the difference therebetween, electromagnetic driving means connected to the output of said comparator circuit and electromagnetically actuatable in response to the output signal of said comparator circuit, connector means for drivingly connecting said electromagnetic driving means with said second restricting means, said connector means controlling the quantity of the light passing through said second restricting means so as to maintain the output of said comparator circuit at zero;

c. means for varying the photometric field including means operatively connecting said first restricting means with said second restricting means in a shiftable predetermined interlocked relationship therebetween, for movement in the same sense in said interlocked relationship propelled by said driving means, to define the quantity of the light passing through said first restricting means in reponse to the variation of said second restricting means, thereby permitting continuous variation of the photometric field.

21. An exposure control device for use with a camera comprising, in combination:

a. first light beam restricting means, including a variable stop, for variably restricting the phototaking light beam, the variable stop being disposed in an optical path of the light beam and at such a position that the marginal rays are unaffected by eclipse effect;

b. second light beam restricting means, including light restricting members for restricting a light beam split out of said phototaking light beam, said members being operatively connected with said variable stop of said first light beam restricting means for operation in the same sense, and being disposed in the light beam split out of said phototaking light beam at a predetermined optical distance from the variable stop so as to control the passage of the marginal rays of the phototaking light beam using eclipse effect to permit the members to function as a field stop;

c. means for establishing a feedback control system including,
   a photoelectric transducer element producing an electric output in response to the intensity of the light beam restricted by said light restricting members,
   a bridge circuit having said element in an arm thereof and elements for setting information on exposure in other arms,
   driving means for driving said light restricting members in response to the output of said bridge circuit to provide control such that the output of said transducer element is maintained at a predetermined value;
d. means for varying the photometric field operatively connected with said second light beam restricting means to permit a selective setting of the photometric field.

22. An exposure control device according to claim 21, wherein said bridge circuit further includes:
   resistive means for setting information on film speed, and
   resistive means for setting information on shutter speed.

23. An exposure control device according to claim 21, wherein said driving means includes a current meter movement.

24. An exposure control device for use with a motion picture camera comprising:
a. first light beam restricting means for restricting the phototaking light beam, including restricting members for varying the light beam passing therethrough, the restricting member being located at a position where the marginal rays intersect an optical axis of a phototaking optical system;
b. second light beam restricting means for restricting a photometric light beam, including restricting members for varying light beam passing therethrough, said second light beam restricting means being operatively connected with said first light beam restricting means for operation in the same sense, the second light beam restricting members being located away from a position where the marginal rays intersect an optical axis of a photometric optical system to permit the second light beam restricting members to control the passage of the marginal rays and thereby to control a photometric field;
c. feedback control means for exposure control including
   a photoelectric transducer element producing an electric output in response to the intensity of the light restricted by said second light beam restricting means,
   a comparator circuit having said transducer element in a part thereof, said circuit comparing the output of said transducer element with a command set for exposure control and producing an output signal in response to the difference therebetween,
   electromagnetic driving means electromagnetically actuated in response to the output signal of said comparator means to drive said second light beam restricting means so as to maintain the output of said photoelectric transducer element at a predetermined value,
d. means for varying the photometric field including means carrying said first and second light beam restricting means so that the optical paths to said two light beam restricting means are different in length and means for varying the difference in path length, thereby permitting control of photometric field by the variation of eclipse of marginal rays of the light received by said second light beam restricting means in response to at least one of: (i) brightness of an object, (ii) a focussing control of the phototaking optical system and (iii) a focal length control of the phototaking optical system.

25. An exposure control device for use with a photographic apparatus having a view finder, a photometric optical system and a phototaking optical system at least a part of which is interchangeable comprising:
a. means for detecting signals representing photographing conditions from said interchangeable phototaking optical system;
b. first restricting means including a first restricting member for varying the passing quantity of the light passing therethrough to restrict the light beam for phototaking, the first restricting member being located at a position where the marginal rays intersect the optical axis of the phototaking optical system;
c. second restricting means including a second restricting member for varying the passing quantity of the light passing therethrough to restrict the light beam for photometry, said second means being operatively connected with said first restricting member for operation in the same sense, the second light beam restricting members being located away from a position where the marginal rays intersect the optical axis of the photometric optical system to permit the second light beam restricting members to control the passage of the marginal rays and thereby to control a photometric field;
d. feedback control means for exposure control including
   a photoelectric transducer element producing an electric output in response to the intensity of the light restricted by said second restricting member.

a comparator circuit having said transducer element in a part thereof, siad circuit comparing the output of said transducer element with a command set for exposure control, and producing an output signal in response to the difference therebetween, and
   electromagnetic driving means electromagnetically actuated in response to the output signal of said comparator means to drive said second restricting means so as to maintain the output of said photoelectric transducer element at a predetermined value, and
e. means for varying the photometric field connected with said second restricting means to additionally actuate said second restricting means, thereby selectively varying the photometric field.

26. An exposure control device according to claim 25, wherein said means for detecting includes
   means for indicating said signals representing photographing conditions in a part of a view finder optical path of said camera.

27. An exposure control device according to claim 25, wherein said phototaking optical system and said photometric optical system include optical members independent from each other.

28. An exposure control device according to claim 25, wherein said means for varying the photometric field includes means for relatively varying the optical paths to said two restricting means of the light beams respectively incident upon said two restricting means.

29. An exposure control device for use with a motion picture camera including a phototaking optical system comprising, in combination:
  a. light restricting means including first and second blades which are connected with each other by a connection permitting relative movement and disposed in an optical path for a light beam coming from an object to be photographed, said first blade having an opening for restricting the photometric light beam, such that said opening of said first blade is disposed at a position capable of stopping the marginal rays of the photometric light beam by eclipse effect to permit photometric field control by the blades, and said second blade having a light restricting portion at a position corresponding to the opening which cooperates with said first blade to vary the opening in size thereof,
  b. feedback control means for exposure control including, a photoelectric transducer element, and an exposure control circuit having said element therein, the output signal of said control circuit and having an output member for relatively displacing said blades, thereby permitting the feedback control to maintain the light quantities passing through said respective openings at respective constant values.

30. An exposure control device according to claim 29, wherein said photoelectric transudcer element is a Cadmium-sulfide cell.

31. An exposure control device according to claim 29, wherein said exposure control circuit includes a bridge circuit having said photoelectric transducer element in an arm thereof and resistors for exposure control in other arms thereof.

32. An exposure control device according to claim 29, wherein said electromagnetic driving means including a meter movement and a member actuated by said meter movement.

33. An exposure control device used with a camera having a phototaking optical system comprising:

a. a first stop for variably restricting the quantity of light for said phototaking optical system, said stop being disposed at a position where the marginal rays intersect the optical axis of the phototaking optical system.
  b. a second stop for variably restricting the quantity of light in the same tendency as said first stop and being operatively connected with said first and being disposed at a position for receiving at least a part of the light beam in said optical system and off an intersecting point of the optical axis of the second stop and the marginal rays of the part of the light beam to permit said second stop to control the passage of the marginal rays and thereby to control a photometric field,
  c. control means for controlling said second stop to effect an optimum exposure in response to brightness of an object to be photographed, said control means including,
  photoelectric transducer element disposed at a position for receiving the light restricted by said second stop and producing an output in response to the intensity of the light received by said element, an exposure control circuit having said element and element for setting information on photographing conditions,
  electromagnetic driving members actuated by the output of said circuit,
  a connecting member for connecting said driving means to said second stop to vary the aperture size in response to the movement of said driving members, thereby to establish a feedback system, said connecting members driving said second stop to maintain the output of said control circuit substantially at zero;
  said second stop being driven cooperatively with said first stop to move toward an average photometric position thereof as the first stop opens and toward a spot photometric position thereof as the first stop closes, thereby permitting continuous variation of the photometric field in response to brightness of an object to be photographed.

* * * * *

UNITED STATES PATENT OFFICE
CERTIFICATE OF CORRECTION

Patent No. 3810206          Dated May 7, 1974

Inventor(s) Keiichi SAKAGUCHI; Atsushi SOMEYA; Noritsugu HIRATA

It is certified that error appears in the above-identified patent and that said Letters Patent are hereby corrected as shown below:

On the first page of the patent, line 73, change the spelling of the Assignee's name from "Cann Kabushiki Kaisha" to -- Canon Kabushiki Kaisha --.

Signed and sealed this 21st day of January 1975.

(SEAL)
Attest:

McCOY M. GIBSON JR.
Attesting Officer

C. MARSHALL DANN
Commissioner of Patents